United States Patent [19]

Mason et al.

[11] Patent Number: 5,367,215
[45] Date of Patent: Nov. 22, 1994

[54] MAGNETIC POLE STATOR DC MOTOR ASSEMBLY

[75] Inventors: Elmer B. Mason, Del City, Okla.; Robert E. Stark, 1101 Schmieding, Springdale, Ark. 72764

[73] Assignee: Robert E. Stark, Springdale, Ark.

[21] Appl. No.: 161,494

[22] Filed: Dec. 6, 1993

Related U.S. Application Data

[63] Continuation-in-part of Ser. No. 4,153, Jan. 13, 1993, Pat. No. 5,283,492.

[51] Int. Cl.$^5$ .................. H02K 16/00; H02K 5/00
[52] U.S. Cl. ........................................ 310/114; 310/91
[58] Field of Search ............... 310/112, 114, 124, 154, 310/40 MM, 40.5, 89, 91

[56] References Cited

U.S. PATENT DOCUMENTS

| | | | |
|---|---|---|---|
| 3,717,780 | 2/1973 | Hohne, Jr. et al. | 310/112 |
| 4,221,984 | 9/1980 | Mason | 310/112 |
| 5,283,492 | 2/1994 | Mason | 310/114 |

Primary Examiner—Steven L. Stephan
Assistant Examiner—E. To
Attorney, Agent, or Firm—Robert K. Rhea

[57] ABSTRACT

A direct current motor having an armature axially supported between magnetic pole plates having opposing pairs of pole shoes extending in interdigital parallel opposition with respect to the periphery of the armature between the pole plates adjacent the armature, is energized by direct current through a pair of coils interposed between and connected with the magnetic pole plates. The respective ends of selected pole shoes are connected with pole plates of like polarity magnetic flux and similarly the remaining of pole shoes are connected at their respective ends with pole plates of opposite polarity magnetic flux density. Wiring and electrical current controls connect a DC source to the coils and armature for providing a maximum torque and speed drive shaft with a minimum of ampere drain from the DC source.

18 Claims, 2 Drawing Sheets

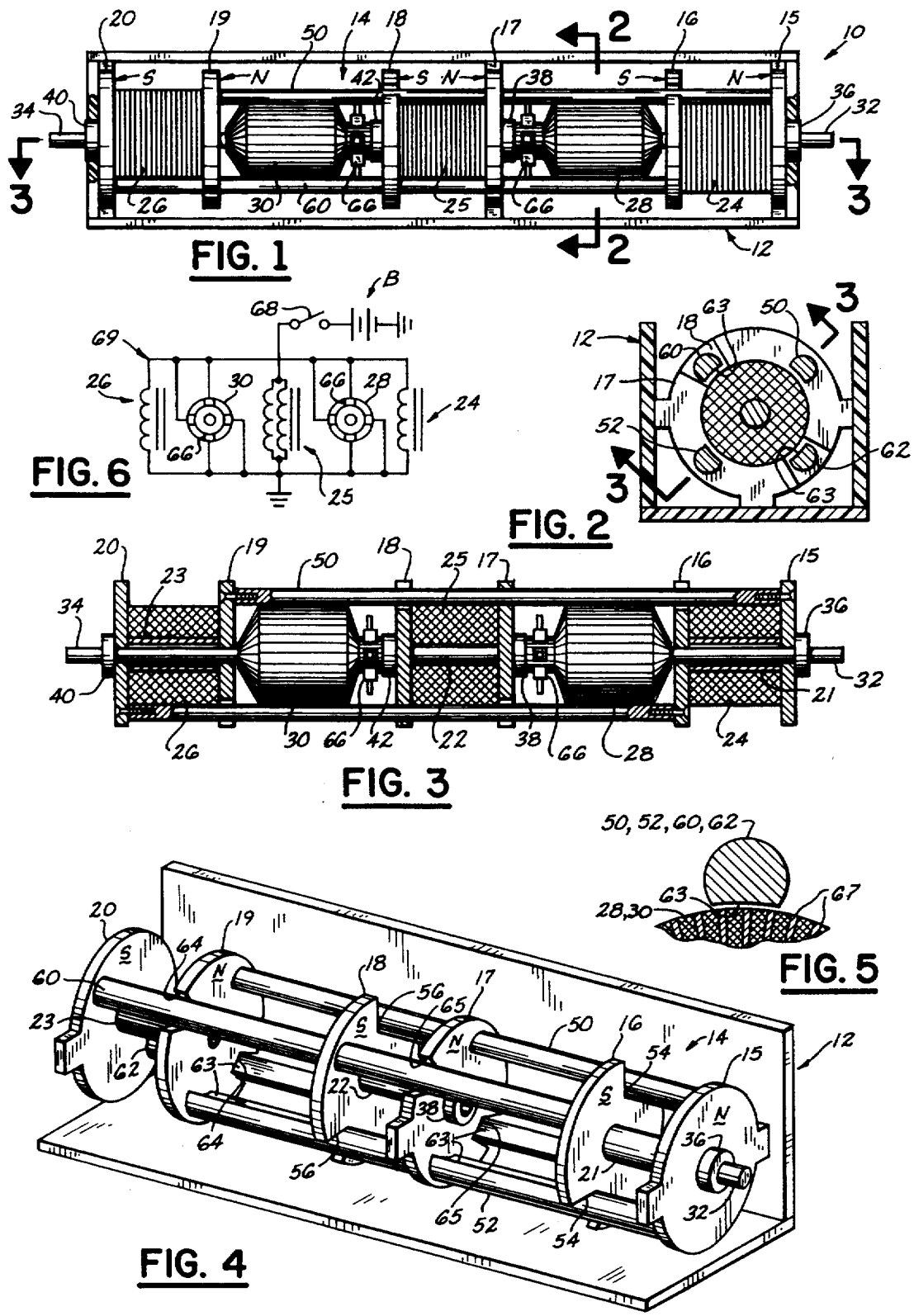

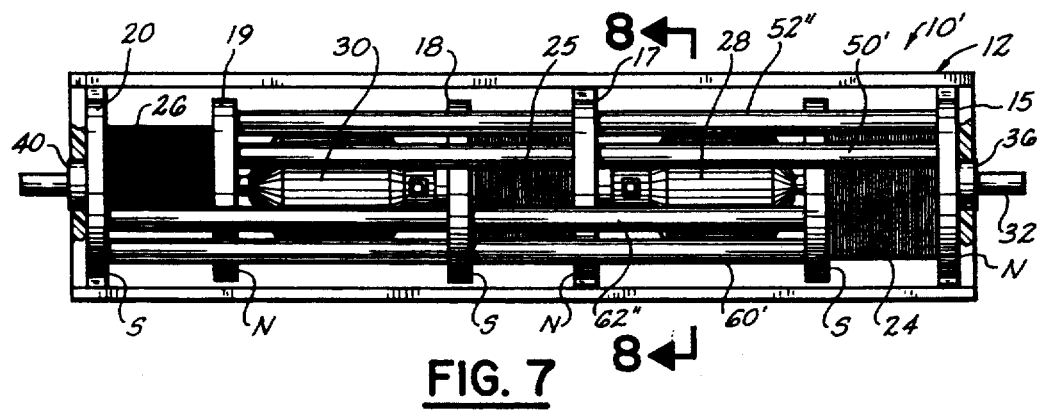
FIG. 7
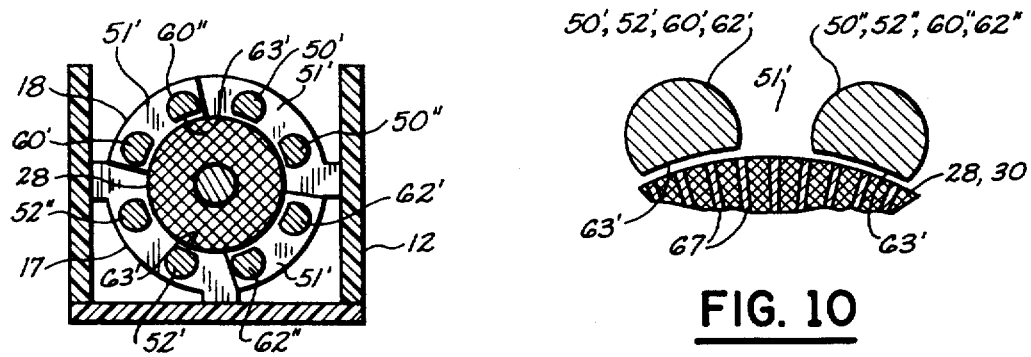
FIG. 8
FIG. 10
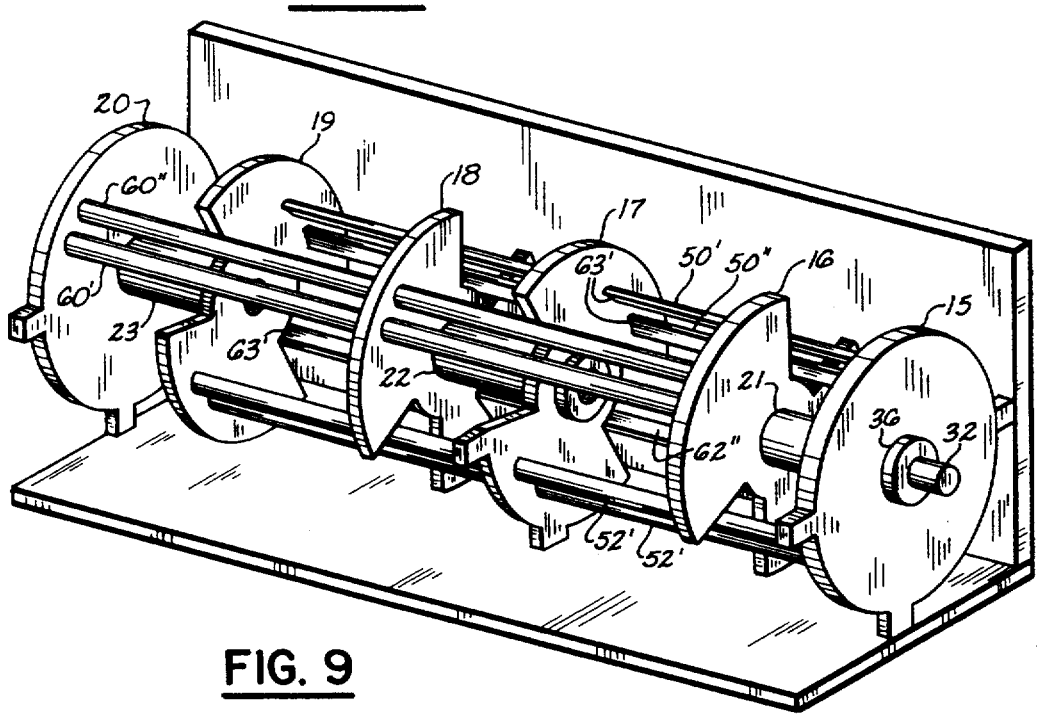
FIG. 9

MAGNETIC POLE STATOR DC MOTOR ASSEMBLY

This application is a continuation-in-part of an application filed by me in the United States Patent and Trademark Office on Jan. 13, 1993 under Ser. No. 08/004,153 for MULTIPLE MAGNETIC POLE DC MOTORS, now U.S. Pat. No. 5,283,492.

BACKGROUND OF THE INVENTION

1. Field of the Invention

This invention relates to direct current motors and more particularly to multiarmature motors having coils or magnets interposed between parallel pole plates establishing a plurality of magnetic pole shoes for exciting armatures.

The relationship of magnetic material (iron) and magnetics is the most difficult problem to overcome in a DC motor. Because the iron used to make up the segments of the winding lobes of the rotor are naturally attracted to the magnetics of the field an unfavorable or counter electromotive force is created. The unfavorable force must be overcome as each segment of the rotor passes through the magnetic field. In order to overcome the unfavorable force, the motor must consume more energy or current.

Conventional technology can only use one of the major forces, magnetic attraction, to cause a rotor to rotate within the magnetic field. The other remaining force, repulsion, cannot be utilized as a favorable force in a conventional DC motor. The force of repulsion, like poles of two magnets repelling each other, is located to far from the working edge of the rotor to be of any great assistance in the operation of the motor.

In such a design, only one armature is operated by each group of stators or field windings resulting in inefficient utilization of the various circuits established and thus limiting the potential of the magnetic circuit established by direct current through coils interposed between magnetizable pole pieces. This also limits the use of available forces derived from the magnetic circuit to attraction, between the field and rotor. The force of repulsion cannot advantageously be used because of its strategic location to the rotor.

This invention substantially increases the magnetic flux on a motor armature by applying magnetic flux of the same polarity to both ends of a plurality of rod-like pole shoes attached to and extending between a pair of magnetic coils and adjacent the periphery of an armature interposed between the coils.

2. Description of the Prior Art

The most pertinent patent is believed to be U.S. Pat. No. 4,221,984 issued to Mason on Sept. 9, 1980 for STATOR FOR MULTIPLE ROTOR DC MAGNETIC MOTOR.

This patent discloses some of the features of the motor of this invention, but does not disclose the feature and advantage of magnetic flux of the same polarity applied to both ends of respective pole pieces of opposite polarity extending longitudinally of an armature. This patent also does not disclose the advantage of additional pole shoes and their location for obtaining desired torque and speed of the armature with relation to efficient use of input amperage as disclosed by this invention.

SUMMARY OF THE INVENTION

In a first embodiment, a pair of iron core coils are respectively disposed between two pairs of pole plates in axially aligned spaced apart relation and form North N and South S poles of the respective pair of pole plates.

A motor armature is disposed in axial alignment between the pole plates with one end portion of the armature drive shaft projecting axially through one hollow coil core.

A pair of North N magnetic pole shoes are disposed diametrically opposite each other with respect to the periphery of the armature and are connected at their respective ends with the North N pole plate of the respective coil and intermediate their ends bridge the South S pole plate of one coil.

Similarly, a second pair of South S pole shoes diametrically opposite each other extend longitudinally of the armature in 90° spaced relationship with respect to the North N pole shoes and are similarly connected with the South S pole plate of the respective coil and intermediate their ends bridge the North N pole plate of one coil.

Normally generated magnetic current concentrates the strength of the polarity forces in the center of the magnetic pole core, e.g., a North pole of a magnet has its greatest strength at the center of the North pole. The same is true for the South pole.

The magnetic forces when realigned within the field of the motor become absolute and operate at a consistently uniform pattern. Realignment of these forces capitalizes the maximum use or conversion of the energy into output torque and speed at the shaft of the motor.

This invention realigns these forces in a uniform plane by connecting the like poles of one or more magnetic members to carrier plates of soft iron. The respective soft iron plates attached to the like poles of each of the magnetic members, either permanent or electromagnets, allow the forces to be utilized as a uniform pattern of magnetic flux regardless of their path as long as the air gap between the carrier plates is constant.

This application of uniform magnetic flux allows several usable configurations, within the field, to be constructed to direct the flux to the rotor. With the addition of the uniform patterns of flux forces it is now possible to utilize the total effects of the two opposing forces, attraction and repulsion (force and counterforce) of the same polarity, of both the field and the rotor, and eliminate the unfavorable force that would normally be present.

This creation of uniform flux patterns within the field allows the use of additional areas of leverage to be applied to the rotor and a second embodiment of the invention discloses this feature. To achieve these additional areas of leverage the pole shoe is longitudinally divided into three parts. Two of the parts form dual pole shoes located precisely in relation to the winding of the rotor and the third part serves as a separation of the dual pole shoes. The separation or division of a single pole shoe into two pole shoes operating in the same area of the armature field removes the potential of the unfavorable forces normally found in conventional DC motors. This occurs at each of the opposing magnetically supplied field working forces. The addition of the points of leverage in a two pole shoe motor results in a four pole shoe two brush motor and a four pole shoe four brush motor becomes a four brush eight pole shoe motor. The addition of twice the leverage on the rotor by the field increases the speed and the torque and only slightly increases the current demand.

Wiring and substantially conventional electrical circuit controls connect a DC source with the coils and brushes on the armature commutator for operating the motor.

This principal object of this invention is to provide a direct current motor having an armature utilizing generated magnetic flux established by a plurality of magnetic pole shoes of opposite polarity selectively connected with magnetic members and disposed in longitudinal extending circumferential spaced-apart relation with respect to the periphery of the armature with magnetic pole plates of the same polarity connected with both ends of the respective pole shoes for greatly increasing the torque and speed of the armature.

BRIEF DESCRIPTION OF THE DRAWINGS

FIG. 1 is a top view of one embodiment;

FIG. 2 is a vertical cross sectional view taken substantially along the line 2—2 of FIG. 1;

FIG. 3 is a longitudinal cross sectional view taken substantially along the line 3—3 of FIG. 1;

FIG. 4 is an isometric view with one housing side wall, the coil wires and the armatures removed for clarity in showing the relative location of the respective pole shoes;

FIG. 5 is a fragmentary vertical cross sectional view, to a larger scale, illustrating the relationship of one magnetic pole shoe relative to the periphery of an armature winding;

FIG. 6 is a wiring diagram;

FIG. 7 is a top view of another embodiment;

FIG. 8 is a vertical cross sectional view, taken substantially along the line 8—8 of FIG. 7;

FIG. 9 is an isometric view with one housing side wall, the coil wires and the armatures removed for clarity to show the relative location of the respective dual pole shoes; and, FIG. 10 is a fragmentary vertical cross sectional view, to a larger to scale, illustrating the relationship of one pair of dual magnetic pole shoes relative to the winding of an armature.

DESCRIPTION OF THE PREFERRED EMBODIMENTS

Like characters of reference designate like parts in those figures of the drawings in which they occur.

In the drawings:

Referring first to FIGS. 1-5, the reference numeral 10 indicates a first embodiment of the motor as whole comprising a nonmagnetic housing 12 supporting a magnetic motor frame work 14.

The frame work 14 comprises three pairs, in the example shown, of pole plates 15-16, 17-18 and 19-20 disposed in spaced-apart coaxial aligned relation within the housing 12.

Soft iron coil cores 21, 22 and 23 are axially disposed between and connected with the pairs of pole plates 15-16, 17-18 and 19-20, respectively, with the cores 21 and 23 being tubular for the reasons presently explained.

A wire or wires is wrapped around the respective coil core 21, 22 and 23 to form a like plurality of coils 24, 25 and 26 with the wires around the center coil 25 being wrapped to supply sufficient magnetic flux for the desired operative task.

Armatures 28 and 30 are axially interposed between the center coil 25 and the end coils 24 and 26, respectively. The axle 32 of the armature 28 projects through the hollow coil core 21, and is supported by bearings 36 and 38 respectively secured axially to the pole plates 15 and 17. Similarly, the axle 34 of the armature 30 projects at one end portion through the coil core 23 and is supported by bearings 40 and 42 axially connected with the pole plates 20 and 18, respectively.

The respective end portions of the armature shafts 32 and 34 are thus coaxial with the magnetic center of the adjacent opposing polarity coil pole plates.

A pair of elongated rod-like North N pole shoes 50 and 52 extend in longitudinal diametrically opposite parallel relation with respect to the armatures 28 and 30 and are connected with the North N pole plates 15, 17 and 19.

Diametrically opposite recesses 54 and 56 are formed in the pole plates 16 and 18 for isolating the respective North N pole shoe 50 and 52 from contact with the South S pole plates 16 and 18.

Similarly, a substantially identical pair of South S rod-like pole shoes 60 and 62 spaced 90° with respect to the North N pole shoes 50 and 52 are connected with the pole plates 16, 18 and 20. Diametrically opposite peripheral portions of the pole plates 19 and 17 are recessed, as at 64 and 65, respectively, to isolate the South S pole shoes 60 and 62 from contact with the South S pole plates 19 and 17.

As best illustrated by FIG. 5, the respective pairs of pole shoes of the diametrically opposite pairs of pole shoes 50, 52 and 60, 62 (FIG. 2) have a longitudinal peripheral portion of their surface milled out on a radius slightly greater than the radius of the respective armature 28, 30 to define a concave recess or arc 63 (FIGS. 2 and 5) on each pole shoe, of the pairs of pole shoes, preferably having a transverse width at least substantially equal with one-half the winding span of the respective armature 28 and 30. The arc 63 of the respective pole shoes is thus substantially equal to an arc spanning three and one-half segments 67 of a seven span armature.

The preferred radial spacing between the periphery of the respective armature and the arcuate recesses 63 is not less than 0,015" or greater than 0.0394" (0.04 cm to 0.01 cm).

Referring also to FIGS. 7-10, the reference numeral 10' indicates a second embodiment of the motor in which like numerals refer to identical parts and prime numerals are used to indicate modified pole shoes and other components.

Briefly stated, the principal difference between the motor 10 and the motor 10' is, the number of pole shoes has been doubled.

For example, the pole shoes 50 and 52 are replaced by dual pole shoes 50'-50" and 52'-52", with the dual pole shoes occupying substantially the same positional relationship relative to the respective armature 28 and 30.

Similarly, the dual pole shoes 50'-50", 52'-52", 60'-60" and 62'-62" are each provided with a longitudinally extending concave arc 63'. The transverse width of each arc 63' is preferably substantially equal with one-third the winding span of the respective armature 28 and 30 with a one-third winding span gap or space 51' between the dual pole shoes as diagrammatically illustrated by FIG. 10.

The radial spacial relationship of the dual poles relative to the armature is identical for that described hereinabove for the motor 10.

The addition of four pole shoes for each opposing pair of pole shoes versus the single pairs of pole shoes of the motor 10 results in substantial increase of torque and speed of the motor 10' relative to the motor 10 without an increase of amperage required for the operation of the motor.

Operation

Other wiring 69 (FIG. 6) connects a battery B to ground through the coils 24, 25 and 26 and armature brushes 66 when a switch 68 is closed.

When the coils are energized by closing the switch 68 the pole plates 15, 17 and 19 form North poles resulting in North magnetic flux polarity applied to the respective ends of the rod-like pole shoes 50 and 52 or 50'-50" and 52'52" respectively connected with the pole plates 15, 17 and 19.

This arrangement substantially increases the magnetic flux density in the North pole shoes 50 and 52 or 50'50" and 52'52" acting on the windings of the respective armature between the North pole plates 15-17 and 17-19.

Similarly, the pole plates 16, 18 and 20 form South poles and South magnetic flux is applied to the respective ends of the South pole shoes 60 and 62 or 60'-60" and 62'62" resulting in an equal and opposite polarity magnetic flux density which cooperates with the magnetic flux in the North pole shoes in acting on the armatures 28 and 30.

Obviously, pulleys, not shown, or other drive means may be secured to the outwardly projecting end portions of the armature drive shafts 32 and 34.

Obviously the invention is susceptible to changes or alterations without defeating its practicability. Therefore, we do not wish to be confined to the preferred embodiment shown in the drawings and described herein.

We claim:

1. A DC axial motor assembly, comprising:
   magnetic motor framework means including a plurality of pairs of parallel axially aligned spaced-apart plates;
   a coil core axially joining each pair of said pairs of plates;
   wires wound around respective said coil cores for forming a like plurality of coils;
   a source of direct current connected with said coils for forming a North and a South polarity magnetic pole plate at respective ends of the respective coil core;
   an armature connected with the source of current and having a shaft axially supported between adjacent coils;
   first rod-like pole shoes extending between and connected with the North polarity pole plates in magnetic flux isolated relation with respect to an intervening South polarity pole plate and cooperative opposing close spaced parallel relation with respect to the periphery of the armature; and,
   second rod-like pole shoes extending between and connected with the South polarity pole plates in magnetic flux isolated relation with respect to an intervening North polarity pole plate and in interdigitated relation with said first pole shoes and cooperative opposing close spaced parallel relation with respect to the periphery of the armature.

2. The motor assembly according to claim 1 in which:
   each pole shoe of said first and second pole shoes having a transverse concave recess formed on a radius complemental with the radius of the armature and facing the periphery of said armature,
   the width of the concave recess being at least substantially equal with one-half the span of the armature winding span.

3. The motor assembly according to claim 2 in which:
   the radial dimension of the spacing between the respective pole shoe concave recess and the periphery of the armature is not less than 0.015" or greater than 0.0394" (0.04 cm to 0.1 cm).

4. The motor assembly according to claim 1 in which:
   each pole shoe of said first and second pole shoes are spaced-apart dual pole shoes each having a transverse concave recess formed on a radius complemental with the radius of the armature and facing the periphery of said armature,
   the width of the respective concave recess and the spacing between said dual pole shoes respectively being substantially equal with one-third the span of the armature winding span.

5. The motor assembly according to claim 4 in which:
   the radial dimension of the spacing between the respective dual pole shoe concave recess and the periphery of the armature is not less than 0,015" or greater than 0.0394" (0.04 cm to 0.1 cm). density in the North pole shoes 50 and 52 or 50'50" and 6. A DC axial motor assembly, comprising:
   magnetic flux generating means including a pair of coils respectively disposed between magnetic flux responsive plates axially joined together by a magnetic flux responsive core in axial alignment with the core of the opposite coil;
   a source of direct current connected with said coils for forming North and South magnetic pole plates at respective ends of each coil of said pair of coils;
   an armature connected with the source of current and having a shaft axially supported between the pair of coils;
   first rod-like pole shoes extending between and connected at their respective ends with the North polarity plates in magnetic flux isolated relation with respect to an intervening South polarity pole plate and opposing close spaced parallel relation with respect to the periphery of the armature; and,
   second rod-like pole shoes extending between and connected at their respective ends with the South polarity plates in magnetic flux isolated relation with respect to an intervening North polarity pole plate and opposing close spaced parallel relation with respect to the periphery of the armature.

7. The motor assembly according to claim 6 in which:
   each pole shoe of said first and second pole shoes having a transverse concave recess formed on a radius complemental with the radius of the armature and facing the periphery of said armature,
   the width of the concave recess being at least substantially equal with one-half the span of the armature winding span.

8. The motor assembly according to claim 7 in which:
   the radial dimension of the spacing between the respective pole shoe concave recess and the periphery of the armature is not less than 0.015" or greater than 0.0394" (0.04 cm to 0.1 cm).

9. The motor assembly according to claim 6 in which:
  each pole shoe of said first and second pole shoes are spaced-apart dual shoes each having a transverse concave recess formed on a radius complemental with the radius of the armature and facing the periphery of said armature,
  the width of the respective concave recess and the spacing between said dual pole shoes respectively being substantially equal with one-third the span of the armature winding span.

10. The motor assembly according to claim 9 in which:
  the radial dimension of the spacing between the respective pole shoe concave recess and the periphery of the armature is not less than 0,015" or greater than 0.0394" (0.04 cm to 0.1 cm).

11. A DC axial motor assembly, comprising:
  magnetic flux generating means including a pair of magnetic members operatively disposed respectively between pairs of magnetic flux responsive axially aligned plates for forming North and South polarity magnetic pole plates of each pair of plates of said pairs of plates;
  an armature between the pair of magnetic members and having a shaft axially supported between the pairs of pole plates;
  a source of direct current connected with said armature;
  first rod-like pole shoes extending between and connected at their respective ends with the North polarity plates in magnetic flux isolated relation with respect to an intervening South polarity dole plate and opposing close spaced parallel relation with respect to the periphery of the armature; and,
  second rod-like pole shoes extending between and connected at their respective ends with the South polarity plates in magnetic flux isolated relation with respect to an intervening North polarity pole plate and opposing close spaced parallel relation with respect to the periphery of the armature.

12. The motor assembly according to claim 11 in which:
  each pole shoe of said first and second pole shoes having a transverse concave recess formed on a radius complemental with the radius of the armature and facing the periphery of said armature,
  the width of the concave recess being at least substantially equal with one-half the span of the armature winding span.

13. The motor assembly according to claim 12 in which:
  the radial dimension of the spacing between the respective pole shoe concave recess and the periphery of the armature is not less than 0.015" or greater than 0.0394" (0.04 cm to 0.1 cm).

14. The motor assembly according to claim 11 in which:
  each pole shoe of said first and second pole shoes are spaced-apart dual shoes each having a transverse concave recess formed on a radius complemental with the radius of the armature and facing the periphery of said armature,
  the width of the respective concave recess and the spacing between said dual pole shoes respectively being substantially equal with one-third the span of the armature winding span.

15. The motor assembly according to claim 14 in which:
  the radial dimension of the spacing between the respective pole shoe concave recess and the periphery of the armature is not less than 0.015" or greater than 0.0394" (0.04 cm to 0.1 cm).

16. A DC motor assembly, comprising:
  magnetic flux generating means including a pair of magnetic members operatively disposed between pairs of magnetic flux responsive plates for forming North and South magnetic plates of each pair of plates of said pairs of plates;
  an armature having a winding span of predetermined width operatively supported between the pair of magnetic members;
  a source of direct current connected with the armature;
  first and second opposing pairs of elongated dual pole shoe pairs extending in longitudinal interdigitated selected spaced relation with respect to the periphery of said armature and connected respectively at their respective dual pole shoe pair opposing ends with selected like polarity North or South polarity plates for forming a uniform concentrated magnetic flux field on the periphery of the armature and normal to its longitudinal axis,
  whereby edge of the respective armature winding span in the direction of rotation is magnetically attracted to the adjacent pole shoe of the respective dual pole shoes of the pairs of dual pole shoes and the spacing between each pair of the respective pairs of dual pole shoes precludes any counter electromotive force on the edge of the respective armature winding span opposite the direction of rotation which decrease the intensity of magnetic flux acting on the armature during switching change and is magnetically repelled in the direction of armature rotation by the other pole shoe of the respective pair of dual pole shoes of the pairs of dual pole shoes.

17. The motor assembly according to claim 16 in which:
  each pole shoe of said pairs of dual pole shoes having a transverse concave recess formed on a radius complemental with the radius of the aramature and facing the periphery of the armature,
  the combined width of the respective concave recess and the spacing between said dual pole shoes of the respective pairs of dual pole shoes being substantially equal with the width of the armature winding span.

18. The motor assembly according to claim 17 in which:
  the radial dimension of the spacing between the respective dual pole shoe concave recess and the periphery of the armature is not less than 0,015" or greater than 0.0394" (0.04 cm to 0.1 cm).

* * * * *